No. 862,208. PATENTED AUG. 6, 1907.
C. A. SMITH.
PISTON AND PISTON RING.
APPLICATION FILED DEC. 19, 1906.
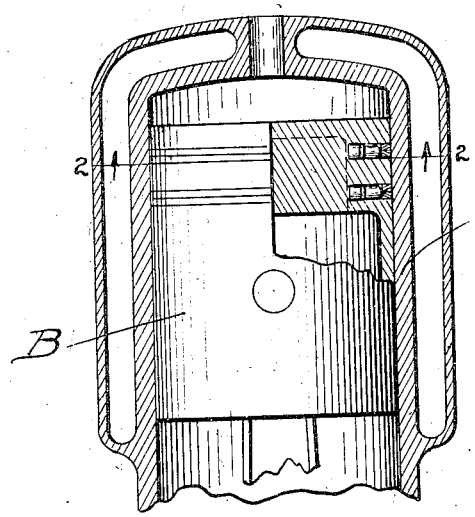
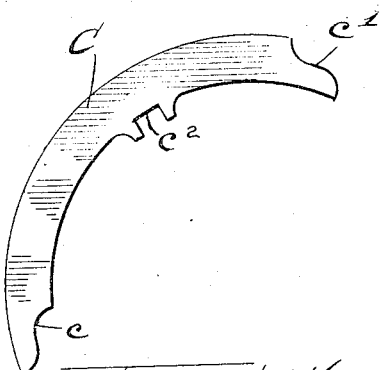
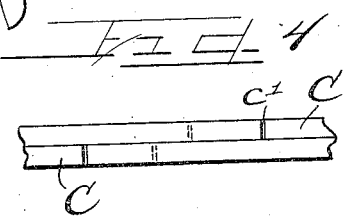
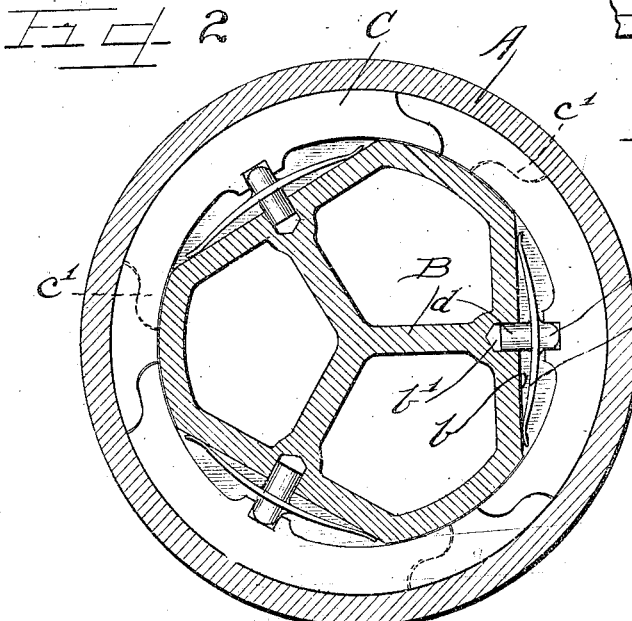
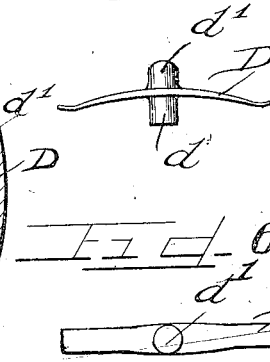
Witnesses: J. W. Angell, J. B. Hannah
Inventor: Curtis A. Smith
by Charles W. Fies, Atty.

UNITED STATES PATENT OFFICE.

CURTIS A. SMITH, OF ELGIN, ILLINOIS.

PISTON AND PISTON-RING.

No. 862,208.  Specification of Letters Patent.  Patented Aug. 6, 1907.

Application filed December 19, 1906. Serial No. 348,510.

*To all whom it may concern:*

Be it known that I, CURTIS A. SMITH, a citizen of the United States, and a resident of the city of Elgin, in the county of Kane and State of Illinois, have invented certain new and useful Improvements in Pistons and Piston-Rings; and I do hereby declare that the following is a full, clear, and exact description of the same, reference being had to the accompanying drawings, and to the letters of reference marked thereon, which form a part of this specification.

Heretofore piston rings necessarily employed in packing pistons in cylinders have usually been constructed as simple bands of metal, frequently of cast iron or soft steel, dependent upon the type of motor, engine or pump in which used. These are engaged in place on the piston in suitable grooves therefor and the ends thereof are either butted or lapped together. In either case a leakage of the steam, water, hydrocarbon vapor or other fluid adapted to pass through the cylinder results. Usually in such a construction a plurality of such rings or bands are used one lying against the other and so arranged that the meeting ends of one ring are separated by a considerable space from the meeting ends of the adjacent ring and pins or other suitable means hold the same from working round the piston to bring the ends of two rings together. Furthermore where ordinary rings are employed the travel of the piston soon wears the rings sufficiently to put the same out of true in consequence permitting a considerable amount of the pressure to be lost by leakage past the rings. Furthermore in explosive engines where considerable heat is evolved, oil passing the rings into the cylinder becomes carbonized and often causes the engine to fire prematurely destroying the efficiency of the engine.

With these existing deficiencies and defects in view the object of my invention is first to provide an improvement in pistons permitting the use of self fitting and adjusting rings.

It is furthermore an object of my invention to provide in connection with a piston, self fitting rings at all times positively held in position to insure a close and a pressure tight fit in the cylinder even though the latter be much worn or out of true.

It is a further object of the invention to provide a piston ring consisting of interchanging duplicate parts each interlocking with the other.

It is furthermore an object of the invention to afford in connection with a piston a piston ring comprising duplicate interchanging sections interlocking to insure a steam and oil tight fit within the cylinder and in connection therewith concealed springs protected from the heat of the engine and acting at all times to bear the rings firmly though lightly against the inner side of the cylinder.

The invention consists in the matters hereinafter described and more fully pointed out and defined in the appended claims.

On the drawings: Figure 1 is a vertical section of a piston embodying my invention showing the same in the cylinder of a water cooled explosive engine. Fig. 2 is an enlarged section taken on line 2—2 of Fig. 1 with the water jacket omitted. Fig. 3 is a detail face view of one of the ring sections. Fig. 4 is a fragmentary edge view illustrating the overlapping of the ends of the upper and lower ring sections. Fig. 5 is an enlarged side elevation of the spring and pivot bearing for the sections. Fig. 6 is a top plan view of the same.

As shown in the drawings: A, indicates the cylinder which may be of course that of a steam, a gasolene or other engine or motor or a pump or other device either operating through pressure or to impart pressure and in which is provided a reciprocating piston B. Said piston B is provided with one or more peripheral grooves as shown in Figs. 1 and 2 each of which is of a width longitudinally of the piston to contain two rings affording a snug fit therefor. The inner wall of the grooves is flattened equal distances apart as indicated at $b$ the number of such flat faces varying of course, with the size of the piston. At the center of each flat face is provided a recess or socket $b'$ of considerable depth. Seated in said socket is a boss $d$ integral with the inner side and at the middle of a leaf spring D, the ends of which are approximately the width of the groove and when the boss is fitted in the socket $b'$, in the piston, extend oppositely to near the ends of the flattened face, therein. On the opposite side of the spring and in alinement with a boss $d$ is a boss $d'$, having a slightly rounded head, as shown in Figs. 2 and 5. The rings each comprise a plurality of duplicate interchangeable flat sections of uniform thickness. As shown, three sections form the complete ring and are curved on the inner side to an arc approximating the bottom or inner wall of a groove in said piston and on the outer edge to an arc of the cylinder and as shown the opposite ends of said ring sections are shaped to interfit with the adjacent ring section, each being cut away obliquely in a waved line, as shown in Fig. 3, or, as shown, approximately in O G form, the one $c$ on the outer side and the other $c$ on the inner side of the section. Positioned on the inner side and somewhat nearer the end $c'$ of the section obliquely cut on the outer sides is a boss $c^2$ cut transversely to provide a shallow recess or socket adapted to receive the boss $d'$ before described, which engages corresponding sections of both the upper and the lower ring.

In securing the ring sections in place, one set or series of sections forming the lower ring are engaged on the boss $d'$ of each spring D, with the longer end $c$, directed to the right and the shorter end $c'$, directed to the left, as shown in dotted lines in Fig. 2 and superposed thereon the second ring sections are also secured on the bosses with the longer end of each section directed toward the left, and the shorter end toward the right as shown in full lines in Fig. 2. Owing to the difference in the cut and the length of the ends of the ring sections, the joints between sections of one ring over lap those of the other absolutely precluding the possibility of leakage of steam or vapor past the same. When passed into the cylinder the springs D are compressed to afford a constant outward pressure on the rings, which is perfectly equalized as the shorter end of one section engages behind the lower end of the next thus insuring uniformity of pressure on the walls of the cylinder.

The operation is as follows: The sections are yielding held at all times against the cylinder with uniform pressure and wear to a true fit therewith affording a perfectly tight packing therefor. In the same manner, owing to the peculiar shape of the ends of the sections, variation or slip of one end on another at all times acts to improve the fit at the end of the sections thus continuous use of rings embodying my invention to afford a more perfect steam and fluid packing. The flat face of one ring section covers the joint in the sections below or above the same and it is that a packing impervious to steam or fluid pressure is thus provided. Inasmuch as the springs are concealed within a recess within the channel for the piston rings they are protected from heat when used in explosive engines or from injury from any other cause and are therefore exceptionally durable.

Obviously if it should be desired to replace a ring section it can be accomplished immediately by the removal of one and the substitution of another section. Of course, owing to the perfection of the packing, oil from the crank case cannot escape in any excessive quantity past the rings or more than barely sufficient to lubricate the cylinder and in this manner carbonization within the cylinder is prevented.

Obviously I do not purpose limiting this application for patent otherwise than necessitated by the prior art as many details of construction may be varied without departing from the principles of this invention.

I claim as my invention.

1. In a device of the class described the combination with a piston having peripheral grooves and the inner walls of said grooves flattened to afford recesses in the bottom of the groove, plurality of rings in each groove comprising sections having curved ends, a socket in each section positioned off center whereby the joints of one ring are out of alinement with the joint of the other ring, a socket in the wall of the piston at approximately the center of each flattened part, a boss engaged at one end in the socket in the wall of said piston and at its outer end engaged in the sockets in said rings and a spring bearing against the flat wall of the piston and forcing said boss outwardly.

2. In a device of the class described the combination with a piston having peripheral grooves the bottoms of which are flattened equal distance apart to afford recesses behind the rings, a socket in each recess, two piston rings in each groove each comprising a plurality of duplicate interchangeable sections, each provided with a recess or socket nearer one end than the other in its inner side whereby the sections of one ring being reversed relatively the joints therebetween the sections are staggered when the socketes are in alinement and a spring pressed boss seated in each socket and bearing in the piston recesses.

3. In a device of the class described the combination with a piston having peripheral grooves of piston rings therefor each comprising a plurality of duplicate sections of equal length, having curved ends and each provided with a socket or recess near one end affording a long and short part on each side of each section, adjacent rings arranged with the adjacent sections of each having their long parts directed oppositely affording joints out of alinement and a spring bearing intermediate the ends of each section and acting to press the sections outwardly.

4. The combination with a piston having one or more peripheral grooves for rings and affording a plurality of recesses behind each groove, two packing rings in each groove each comprising interchangeable sections the end of which are obliquely cut in a curved line, the joints of one ring falling at about the middle of the other ring sections and springs acting to press the sections outwardly and to hold all the sections from movement around the periphery of the piston.

5. The combination with a piston provided with peripheral grooves to receive the piston rings, of piston rings seated in said grooves and comprising duplicate interchangeable sections each shaped complementally at the ends to interfit and affording an oblique curved joints, and a boss pressing said piston ring yieldingly outward against the wall of the cylinder.

6. In a device of the class described the combination with a peripherally grooved piston of piston rings therefor two fitted in each groove each comprising a plurality of duplicate interchangeable sections, springs engaging said sections of each ring intermediate their ends and acting to press the same outwardly against the cylinder, the joint in one ring being overlapped by a section of the other ring.

7. A piston ring embracing duplicate interchangeable sections each comprising a strip of steel or other suitable material shaped to correspond on its outer face with the periphery of the cylinder, and cut obliquely at its ends to afford oblique joints the one directed outwardly and the other inwardly, a notch on the inner side of the section at unequal distances from its ends, springs engaged in the piston and each engaging an upper and a lower section and acting to force the section outwardly, the section of one ring being arranged with the longer ends thereof directed oppositely from the longer ends of the sections of the other ring whereby the joints in one ring are overlapped by a section of the other ring.

8. Piston rings embracing interchangeable sections cut to afford oblique joints and each arranged with a socket at its inner side unequal distances from the ends the longer ends of the sections of one ring being turned oppositely from the longer ends of the sections of the other ring and springs engaged on the piston and engaging also corresponding sections of each ring and acting to force both equally outward.

9. A device of the class described comprising a piston ring form of a plurality of duplicate interchangeable sections each shaped to conform with the inner surface of the cylinder and provided with obliquely cut curved ends, one directed outwardly and the other inwardly in O G form, and shaped to be self fitting by wear and a spring pressed boss firmly bearing against said rings.

10. In an engine the combination with a cylinder and a piston of duplicate interchangeable piston ring sections therein each having curved ends and a socket therein positioned nearer one end than the other adapted when the socket of the section are in alinement to afford overlapping and tight joints, springs bearing against the piston and a boss actuated thereby and engaging each a section of a lower and an upper ring and acting to force the same equally against the wall of the cylinder.

11. A piston ring comprising duplicate interchangeable sections curved oppositely at the ends to be mutually tight fitting by wear, springs bearing against the piston and sections of the ring intermediate the ends thereof and acting to hold the same firmly against the cylinder.

In testimony whereof I have hereunto subscribed my name in the presence of two subscribing witnesses.

CURTIS A. SMITH.

Witnesses:
 WALDO P. JOHNSON,
 C. W. HILLS.